US008978835B1

(12) United States Patent
Larock

(10) Patent No.: US 8,978,835 B1
(45) Date of Patent: Mar. 17, 2015

(54) APPARATUS FOR CONTROLLING THE ROTATIONAL SPEED OF A WHEEL OF A SKATEBOARD, SKATE OR SIMILAR WHEELED DEVICE

(71) Applicant: Jason Mathew Larock, Cameron Park, CA (US)

(72) Inventor: Jason Mathew Larock, Cameron Park, CA (US)

(*) Notice: Subject to any disclaimer, the term of this patent is extended or adjusted under 35 U.S.C. 154(b) by 112 days.

(21) Appl. No.: 13/788,014

(22) Filed: Mar. 7, 2013

(51) Int. Cl.
*A63C 17/14* (2006.01)
*F16D 63/00* (2006.01)

(52) U.S. Cl.
CPC ............ *A63C 17/1409* (2013.01); *F16D 63/00* (2013.01)
USPC ...................... 188/1.12; 280/11.205; 188/83

(58) Field of Classification Search
USPC ........... 188/1.12, 2 A, 76, 79.57, 82.7, 82.74, 188/83, 114; 301/5.301, 6.1; 280/11.204, 280/11.205, 11.211, 11.212, 11.214; 192/217.6, 217, 217.7
See application file for complete search history.

(56) References Cited

U.S. PATENT DOCUMENTS

| | | | | | |
|---|---|---|---|---|---|
| 911,412 | A | * | 2/1909 | Lang | 188/83 |
| 1,189,355 | A | * | 7/1916 | Ellett | 192/217.6 |
| 3,182,962 | A | * | 5/1965 | Gray | 254/375 |
| 3,823,952 | A | * | 7/1974 | Kukulowicz | 280/11.205 |
| 3,900,203 | A | * | 8/1975 | Kukulowicz | 280/11.205 |
| 4,182,194 | A | * | 1/1980 | Tomozawa | 474/160 |
| 4,295,547 | A | * | 10/1981 | Dungan | 188/2 R |
| 4,723,646 | A | * | 2/1988 | Scheneman, Jr. | 193/35 A |
| 5,769,432 | A | * | 6/1998 | Tybinkowski et al. | 280/11.204 |
| 6,102,168 | A | * | 8/2000 | Brandriff et al. | 188/71.5 |
| 2004/0108768 | A1 | * | 6/2004 | Weiss et al. | 301/5.301 |
| 2004/0262860 | A1 | * | 12/2004 | Chen | 280/11.204 |

* cited by examiner

*Primary Examiner* — Bradley King
*Assistant Examiner* — Stephen Bowes
(74) *Attorney, Agent, or Firm* — Thomas R. Lampe

(57) ABSTRACT

Apparatus for controlling the rotational speed of a wheel of a skateboard or other similar wheeled device includes a lug adapter projecting away from a wheel axle, a wheel contact member for engaging the wheel face, wheel contact member engagement structure applying a frictional force to the wheel contact member and manually operable control structure to vary the magnitude of the frictional force.

15 Claims, 5 Drawing Sheets

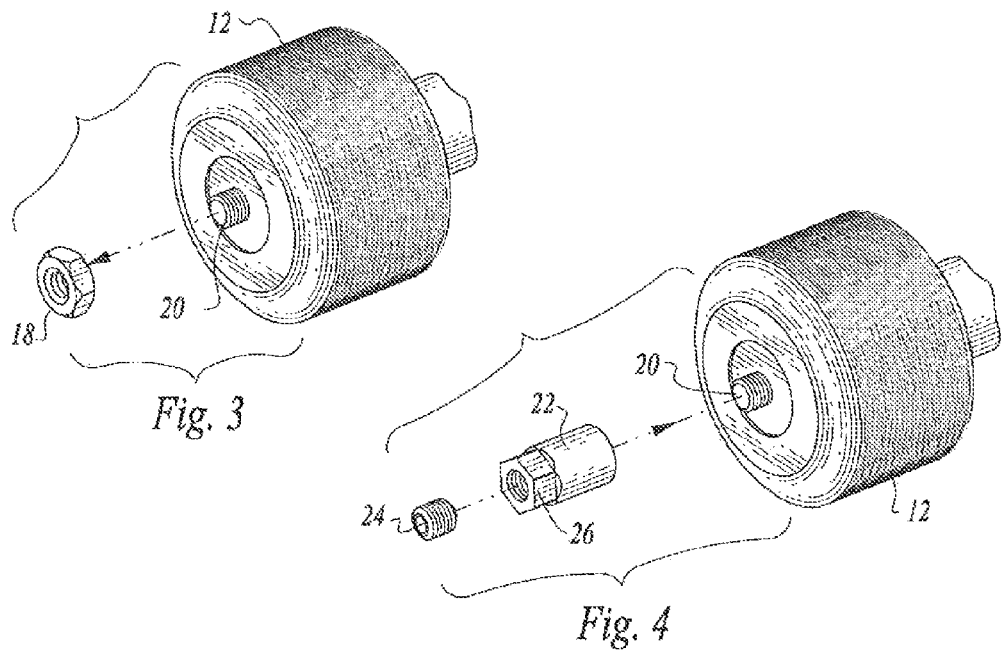
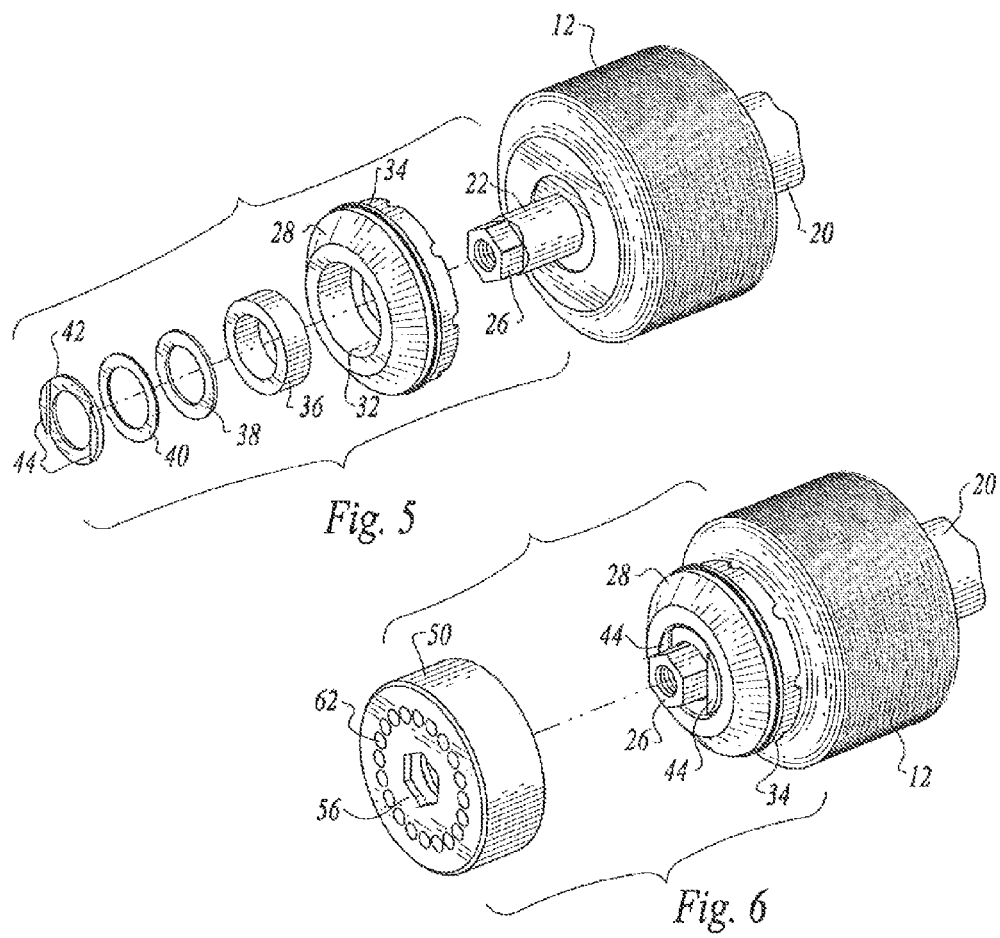

US 8,978,835 B1

APPARATUS FOR CONTROLLING THE ROTATIONAL SPEED OF A WHEEL OF A SKATEBOARD, SKATE OR SIMILAR WHEELED DEVICE

TECHNICAL FIELD

This invention relates to skateboards, skates and similar wheeled devices, and more particularly to structure for controlling the rotational speed of a wheel on the device.

BACKGROUND OF THE INVENTION

Skateboards, skates, longboards and the like are typically free wheeling devices, that is, the wheels are not connected to brakes or other structures employed to halt or impede the speed of the wheels.

DISCLOSURE OF INVENTION

The present invention relates to apparatus for controlling the rotational speed of a wheel supported by an axle of a skateboard, skate or similar wheeled device used to support and transport an individual. For example, the apparatus may suitably be used to stop (prevent) or slow down or limit the rotational speed of the wheels when an individual is a novice user of the device. The apparatus is readily adapted for retrofitting an existing skateboard, skate, longboard or similar device. Alternatively, the apparatus may be incorporated with the skateboard or similar wheeled device when originally manufactured and sold.

The apparatus includes a lug adapter connected to the axle of the device which is non-rotatable relative to the axle and projects outwardly from the axle and away from a wheel rotatable about the axle, the wheel having a wheel face.

A wheel contact member is rotatably mounted on the lug adapter for engaging the wheel face and rotating with the wheel.

Wheel contact member engagement structure is mounted on the lug adapter for applying a frictional force to the wheel contact member resisting rotational movement of the wheel contact member and the wheel when the wheel contact member engages the wheel.

Manually operable control structure is in operative association with the wheel contact member engagement structure to selectively vary the magnitude of the frictional force applied to the wheel contact member by the wheel contact member engagement structure.

Other features, advantages and objects of the present invention will become apparent with reference to the following description and accompanying drawings.

BRIEF DESCRIPTION OF DRAWINGS

FIG. 3 is an exploded, perspective view showing a nut being removed from a wheel axle of a skateboard;

FIG. 4 is an exploded, perspective view illustrating the nut being replaced by a lug adapter in accordance with the teachings of the present invention;

FIG. 5 is a perspective, exploded view illustrating the lug adapter in place on the axle and prior to certain additional structural components of the invention being positioned in place on the lug adapter;

FIG. 6 is an exploded view illustrating the structural components of FIG. 5 in place on the axle and prior to placement of a dial housing of the invention on the end of the lug adapter;

BEST MODE FOR CARRYING OUT THE INVENTION

Figure 1:
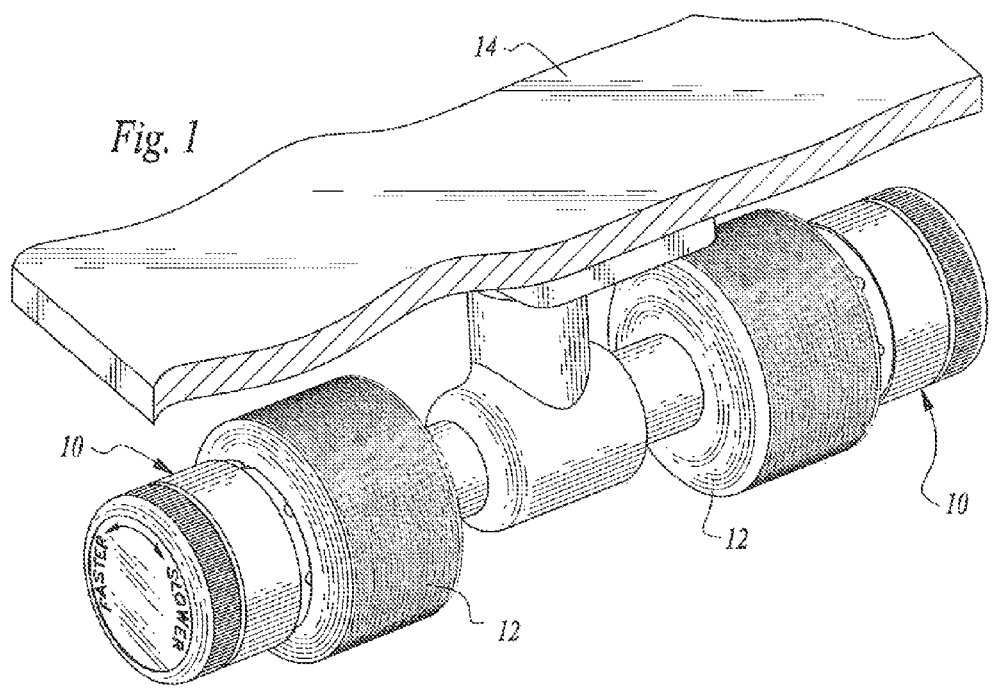
FIG. 1 is a perspective view illustrating apparatus constructed in accordance with the teachings of the present invention attached to both the right and left wheels of a skateboard.
Figure 2:
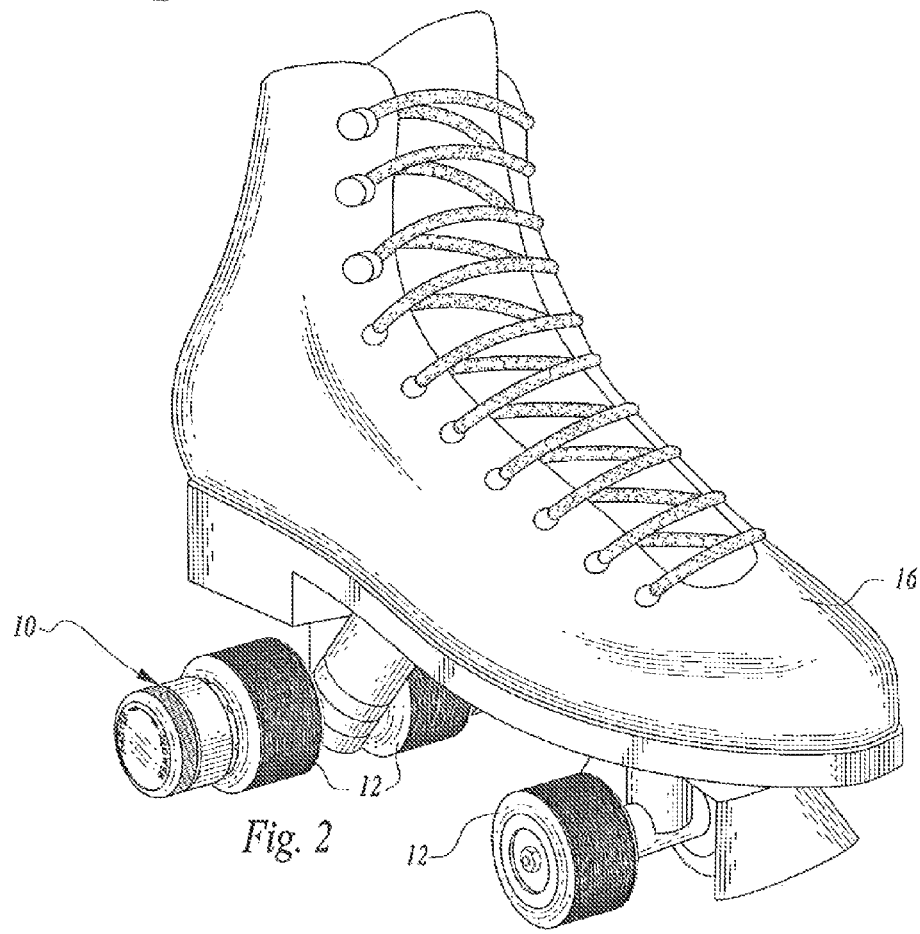
FIG. 2 is a perspective view illustrating a roller skate having apparatus of the present invention attached to the rear wheels thereof.
Figure 7:
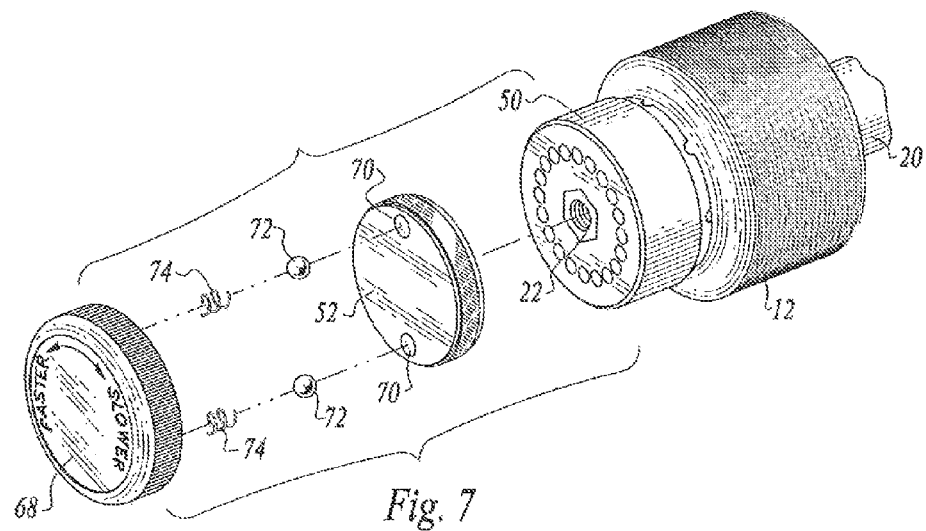
FIG. 7 is a perspective, exploded view illustrating the dial housing in place on the lug adapter locked against relative rotation with the lug adapter and elements of a hand knob assembly of the invention prior to assembly and attachment to the lug adapter.

Referring now to the drawings, apparatus constructed in accordance with the teachings of the present invention is identified by reference numeral 10. FIG. 1 illustrates apparatus 10 installed on both the left and right wheels 12 of a skateboard 14. In FIG. 2, the apparatus 10 is installed on both the right and left rear wheels 12 of a roller skate 16, only the apparatus on one of the wheels being visible in this figure. The apparatus must be installed on both the left and right side of the skateboard or skate and employed together to prevent "pulling" to one side or the other.

When retrofitting the skateboard, skate, longboard or similar device to employ apparatus 10, the original wheel lug nut is removed from the axle supporting the wheel. This is shown in FIG. 3 wherein the lug nut 18 has been removed from the axle 20 supporting wheel 12.

The apparatus of the present invention includes a lug adapter 22 which, as is shown in FIG. 4, is screwed onto the original axle 20 to replace the original nut and again retain the wheel. A small set screw 24 is installed into the inner diameter of the lug adapter and is screwed tightly down to the face of the original axle, which creates a safety locking mechanism to prevent the lug adapter 22 from unthreading from the original axle 20. The lug adapter is round and smooth over most of its outer surface and has a wrench engagement area of hexagonal configuration 26 to facilitate attachment of the lug adapter to the axle or detachment of the lug adapter from the axle by a wrench or other tool. As will be seen below, the hex area 26 cooperates with other components of the apparatus to prevent them from spinning relative to the lug adapter.

Figure 12:
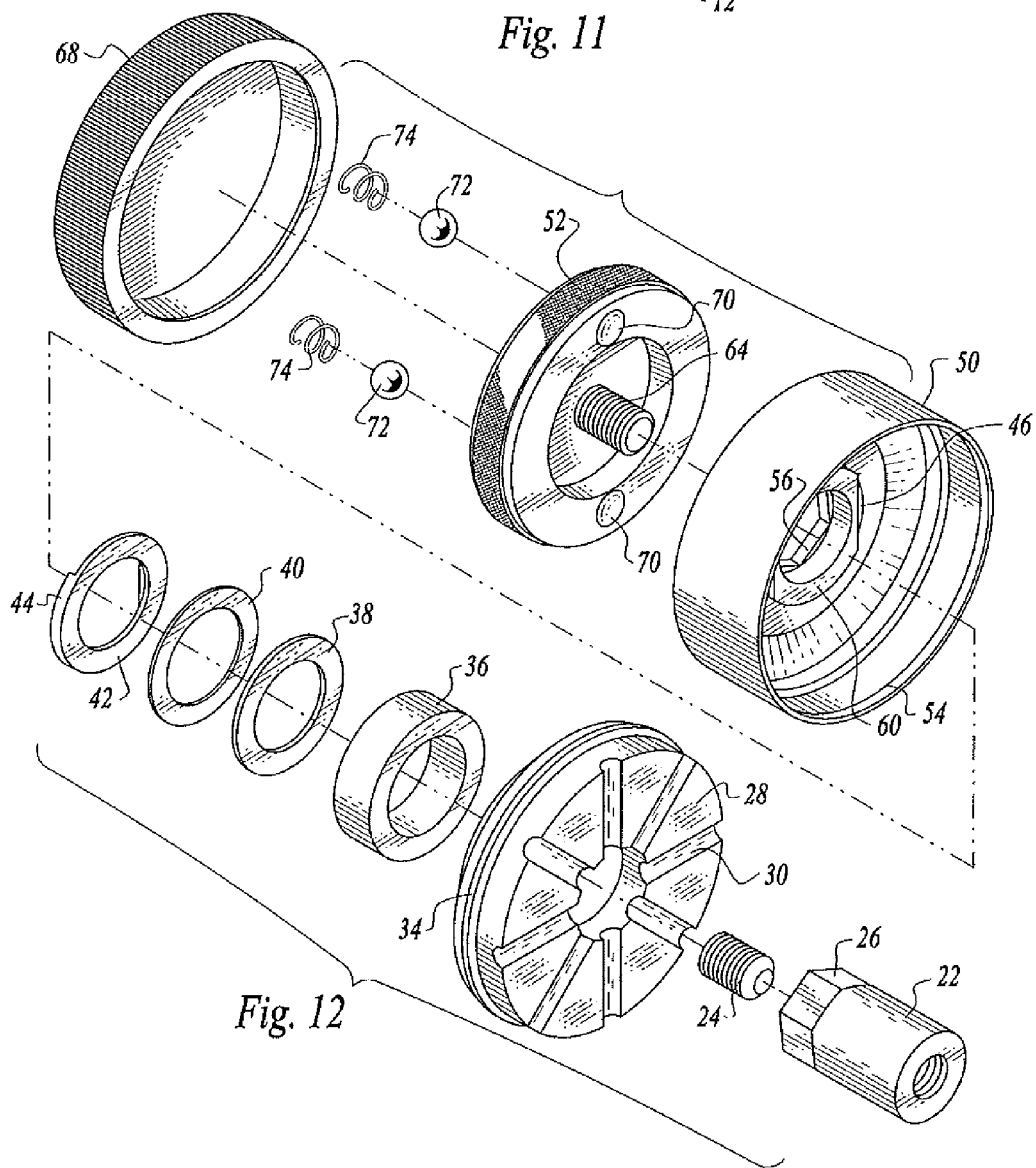
FIG. 12 is a perspective, exploded view illustrating all the structural elements of the apparatus spaced from one another and prior to assembly.

After the lug adapter has been installed, a wheel contact member 28 having a disc-like configuration is mounted on the lug adapter as shown in FIG. 5. The wheel contact member is for the purpose of contacting the face of the wheel 12 with which it is associated. The wheel contact member has grooves 30 (see FIG. 12) in the wheel contacting face thereof, the edges of the grooves providing improved gripping to the face of the wheel. The grooves also allow for debris to accumulate to ensure that the wheel contact member 28 is in constant contact with the face of the wheel 12 during operation of the apparatus. The inner diameter of the wheel contact member 28 is piloted by the outer diameter of the lug adapter to ensure that it spins concentric to the lug adapter. The wheel contact member 28 has a deep counterbore feature 32 on the back side thereof for accommodating other structural members of the apparatus as will be described below. The wheel contact member includes a radially extended projection or lip 34.

Figure 16:
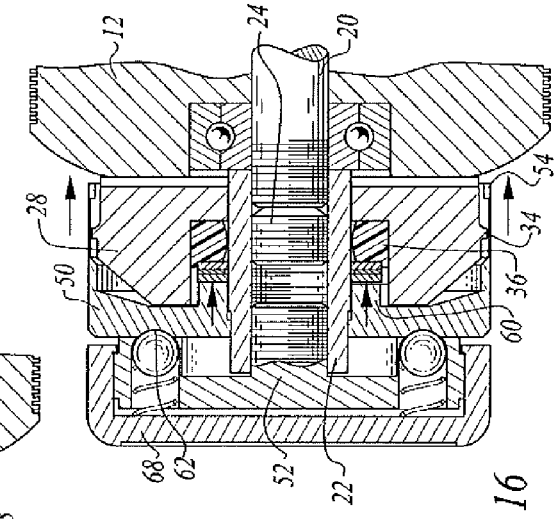

As will also be described in greater detail below, the wheel contact member during operation of the apparatus spins with the wheel 12 as the wheel spins which is critical to ensure that the wheel contact member 28 does not drag across the face of the wheel and damage the wheel. If the apparatus is pre-installed at a factory, the wheel contact member can be interchanged at the factory to fit any wheel design and diameter, without affecting inner working features within the dial housing assembly of this invention as indicated below. If the apparatus is sold separately, a wide range of sizes would be available to fit different wheel sizes and contours, again without affecting operation of working features inside the dial housing 50. The wheel contact member 28 spins freely within the dial housing 50 when non-compressed and when all the inner components within the dial housing are compressed, except when deadlock occurs which is shown in FIG. 16 and will be described. It should be noted that a lug adapter 22 could be permanently affixed to an axle at the factory if the skate or other device is dedicated for use with the apparatus of this invention.

Positioned within the counterbore 32 of wheel contact member 28 is a wear resistant compressible cushion 36. The compressible cushion is formed of resilient rubber material such as neoprene material. The cushion is inserted with a tight fit into the counterbore 32. It fits tightly so that when compressed by the tightening mechanism of the hand knob assembly as described below, the outer diameter of the cushion 36 swells into the inner diameter of the counterbore 32 thus binding the cushion and wheel contact disc together to ensure that they spin together and not separately. The inner diameter of the cushion 36 is a larger diameter than the outer diameter of the lug adapter 22 so that when compressed, the inner diameter of the cushion has an area to swell into and does not swell onto the lug adapter which may cause melting while spinning.

It is also important to note that if the cushion 36 did not exist, tightening of the hand knob of this apparatus (a feature described below) would cause a premature pinch of the slip washer (also described below) which would stop spin of the wheel 12 too soon. The cushioning effect of the cushion is what creates a "variable" wheel speed effect in the apparatus, which ultimately stops the wheel spin when the cushion 36 is fully compressed and a slip washer 40 of the apparatus pinched entirely.

Also positioned in the counterbore 32 of the wheel contact member 28 are a steel washer 38, a wear resistant, low friction slip washer 40 and a steel washer 42, the functions of which will be described below. The washers 38, 40, 42 are disposed about lug adapter 22 and moveable relative thereto.

Apparatus 10 includes a hand knob assembly which includes a dial housing 50 connected to the lug adapter and a rotatable hand knob.

Dial housing 50 has an outer lip or rim projection 54 which snaps over lip 34 of wheel contact member 28 and has a hexagonal opening 56 which is positioned over hex area 26 of the lug adapter. Dial housing 50 is thus locked against rotational movement. However, the dial housing may move axially a certain distance relative to the lug adapter and the wheel contact member 28. The dial housing 50 encapsulates wheel control member 28 and the cushion 36 and washers 38, 40 and 42.

The back side of the dial housing has a raised boss 60 which is the primary plunger (compressor) of the inner cushion 36 and washers. The raised boss applies direct force to the series of washers which causes the variable speed settings and total wheel stoppage as the slip washer 40 becomes fully pinched between steel washers 38 and 42. Steel washer 38 is permanently locked to raised boss 60 during assembly so it will not spin with slip washer 40.

Once the dial housing is snap fastened to the wheel contact disc 28 the wheel contact disc will continue to have the ability to spin freely within the dial housing 50 without falling out when at a neutral state (non-compressed) or when at compressed state due to snap and retention affect of 34 and 54 working together.

The outer face of the dial housing has a circular pattern of ball detents 62.

Figure 8:
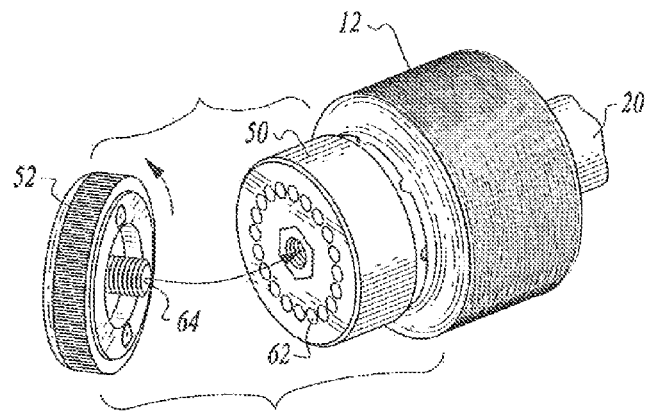
FIG. 8 is a side, elevational view showing the hand knob assembly in place relative to the lug adapter and dial housing.

Hand knob 52 includes a threaded shaft 64 which is threaded into the outer or distal interior of lug adapter 22 as shown in FIG. 8 for example. The peripheral surface of the hand knob 52 is knurled to create a grip when a plastic cap or cover is pressed onto the knurled surface to ensure that the plastic cap 68 does not spin freely on the narrow surface after being pressed on. The underside of the hand knob 52 around shaft 64 preferably has a "relief area" which creates clearance for the lug adapter 22 as it encroaches into this area during tightening of the hand knob assembly.

Figure 9:
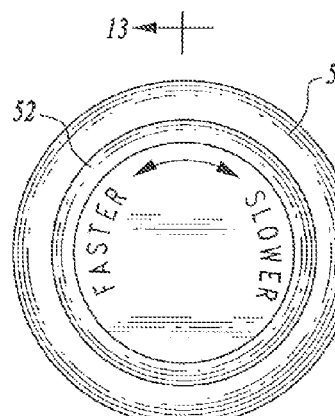
FIG. 9 is an enlarged, elevational view of the apparatus.
Figure 10:
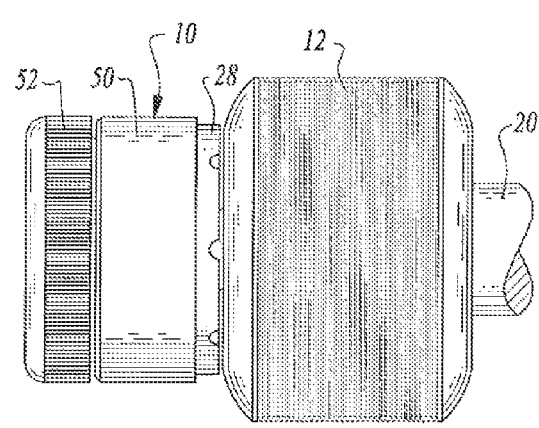
FIG. 10 is a front, elevational view of the apparatus attached to the lug adapter with a disc-like wheel contact member spaced from the skateboard wheel.
Figure 11:
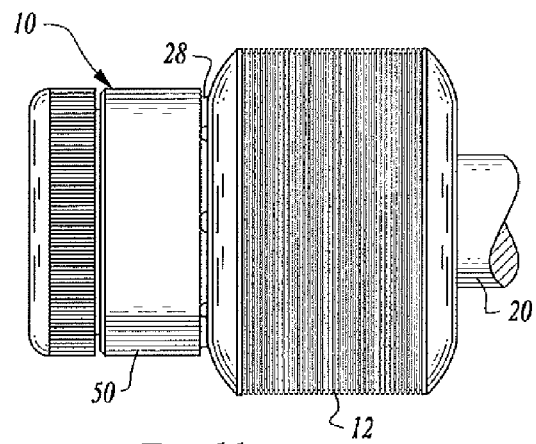
FIG. 11 is a view similar to FIG. 10, but illustrating the wheel contact member engaging the outer surface of the wheel.

Two throughbores 70 are formed in hand knob 52 and accommodate therein two ball bearings 72 and two springs 74. The plastic knurled cover 68 presses on by force during assembly and retains the balls and springs. After the cover 68 is pressed onto hand knob 52 they become permanently bonded and will spin together. The throughbores 70 are somewhat smaller than the ball diameter at the bottom of the throughbore so that they will not fall out of the throughbores. The ball bearings and springs combinations allow the user to count clicks by listening to and feeling the clicks and counting them. It is important to listen/feel and count the clicks to ensure that both sides of the skateboard, skate or longboard have equal pressure on both sides to prevent "pulling" in one direction or the other. However, even if both wheels aren't set perfectly identical the product will still compensate to a certain degree to reduce pulling which is due to the action of the slip disc. Although the user should make every effort to listen to the audible clicks when adjusting the dials it does not have to be perfectly equal on each side. The pressure of the balls in the ball detents also prevents the hand knob assembly from loosening (backing off) while the apparatus is being used. It is a safety mechanism. The front end of the hand knob assembly may have specific information for how to use the product including directional arrows to instruct the user how to decrease or increase the wheel speed. See FIG. 9. Furthermore, suitable indicia may be employed on the external handle surface and adjoining structure to indicate the amount of rotation of the handle.

Referring now to FIGS. 13-16, FIG. 13 illustrates the condition of the various structural components which enables the wheel 12 to spin freely. This is the neutral or non-compressed position of the apparatus. It should be noted that the wheel contact member 28 is not in engagement with the outer face of the wheel.

Figure 14:
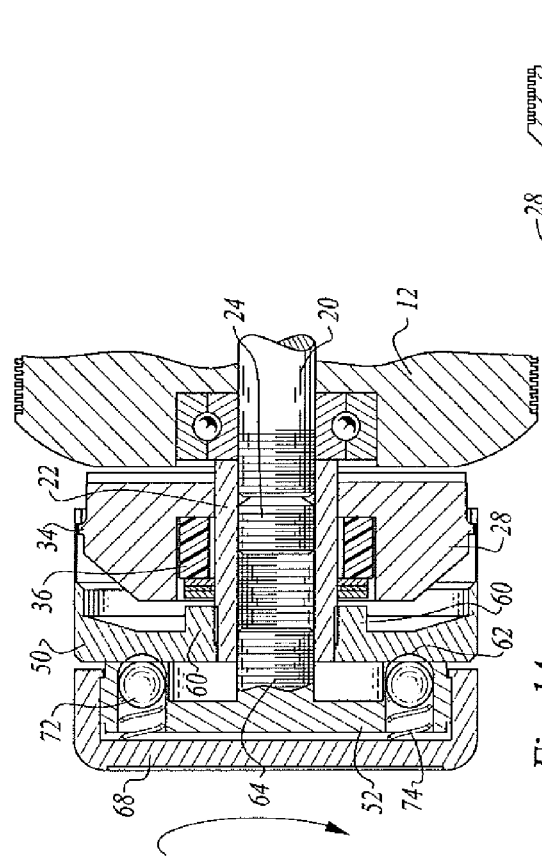
FIGS. 13-16 are cross-sectional views taken along the line 13-13 of FIG. 9 illustrating the relative positions assumed by structural elements of the apparatus in sequential stages of operation.
Figure 13:
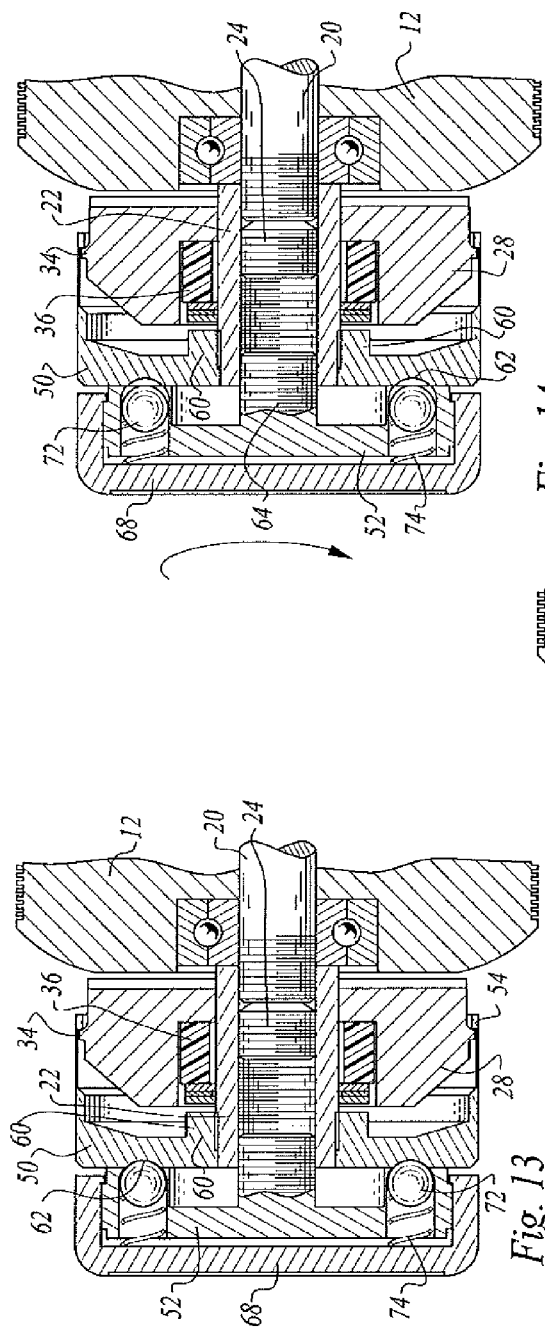

FIG. 14 illustrates the condition of the structural elements when compression has just begun to slow the wheel speed.

The curved arrow represents the direction of tightening of the hand knob to begin the tightening process to slow the wheel speed. Note that the balls have been lifted out of the ball detents at this initial stage and subsequent phase of compression.

Figure 15:
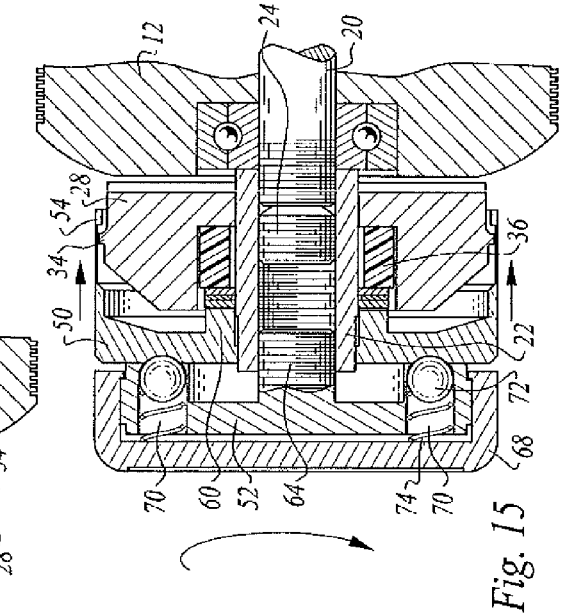

FIG. 15 shows compression "in progress" and wheel speed reduced. The dial housing 50 is moving to the right as shown by the arrows. The cushion 36 is beginning to compress. The wheel contact member 28 is still able to spin but more slowly to reduce wheel speed. The slip washer 40 is also being compressed. Resistance to wheel rotation increases as compression continues and slip washer 40 rotational speed slows.

FIG. 16 shows the condition of full compression. The wheel speed has stopped. The cushion 36 is fully compressed and bulging toward the lug adapter 22, but not touching. The slip washer 40 is fully pinched and unable to spin and a hard stop engagement exists between the dial housing 50 and the wheel contact member 28 to ensure total wheel stoppage.

Steel washer 38 provides a solid face to one side of the cushion and helps to force the cushion 36 into the counterbore 32 of the wheel contact member 28 to ensure that the cushion 36 spins with the wheel contact member 28. The diameter of the steel washer 38 is smaller than the diameter of the cushion 36 to cause expansion of the cushion 36 during compression to force the cushion to expand into the inner diameter of the wheel contact member 28 and counterbore area 32 so that they are bound together. The inner diameter of steel washer 38 is also piloted by the smooth outer diameter of the lug adapter 22 to ensure that it spins concentric to the lug adapter 22. The top side of the steel washer provides a smooth and solid surface to contact the wear resistant low friction slip washer 40. Steel washer 38 compresses against the face of the cushion 36 and are bound together by friction and spins with the cushion 36 and with the wheel contact member 28. It is important to note that the wheel contact member 28, the cushion 36 and washer 38 all become bound together by friction and spin together simultaneously as the wheel spins.

The slip washer 40 is suitably formed of wear resistant, low friction bearing bronze material. The inner diameter of the slip washer 40 is also piloted by the smooth outer diameter of the lug adapter 22 to ensure that it spins concentric to the lug adapter 22. During rotation slip washer 40 slips/spins between steel washer 38 and steel washer 42 when there is no force being applied from the hand knob assembly. The slip washer 40 will become gradually binded when the hand knob assembly 52 is tightened due to the cushioning effect of cushion 36. The greater the tightness of the hand knob the more binded the washers 38, 40, 42 will become to the point where the slip washer 40 will no longer spin and the direct effect is a variably slowed and fully stopped wheel.

Steel washer 42 provides a solid face to one side of the slip washer 40. The steel washer 42 is permanently locked with keyway 44 during assembly to raised boss 60 so that is will not spin freely with washer 40. The inner diameter of steel washer 42 is also piloted by the smooth outer diameter of the lug adapter 22 to ensure that it spins concentric to the lug adapter while permanently bonded to raised boss 60 and keyway 46. The top side of washer 42 is permanently locked with keyway 44 to the raised boss 60 and keyway 46 (plunger) on the under side of the dial housing 50.

Because the wheel contact member 28, the cushion 36 and the steel washer 38 become binded during compression they all spin together with the wheel 12. Therefore, the top surface of washer 38 becomes a slip "face" for the slip washer 40. It is important to note that the "disc slippage" occurs when slip washer 40 slips in between the steel washer 38 and steel washer 42, and steel washer 38 does not slip because its friction locked, semi-embedded into the face of cushion 36 and steel washer 42 does not slip as it is permanently locked with keyway to raised boss 60 during assembly. See FIG. 16. As the forces increase during compression from circular boss 60 of the dial housing, then gradually slip washer 40 will become pinched between steel washer 42 and steel washer 38 and the wheel will spin more slowly and eventually stop. The "deadlock" shown in FIG. 16 assures full stop in case there is tendency for additional slipping of slip washer 40.

This apparatus is important and useful in a number of respects. The apparatus can be locked down entirely to prevent wheel rotation so that the rider can focus solely on learning the fundamentals of balance. The apparatus can also be set to slow the wheel rotation speed, which allows beginners the opportunity to safely learn how to ride without becoming discouraged. As the rider's skills improve, wheel speed can be gradually increased simply by adjusting the hand knob assembly. When the rider is fully confident and capable, the apparatus can be disengaged entirely and the wheels will spin freely.

The invention claimed is:

1. An apparatus for controlling the rotational speed of a wheel supported by an axle of a wheeled device in the form of a skateboard or roller skate, said apparatus for controlling the rotational speed of the wheel during use of the wheeled device and comprising, in combination:
    a lug adapter connected to the axle, said lug adapter projecting outwardly from the axle and away from the wheel rotatable about said axle, said wheel having a wheel face;
    a wheel contact member rotatably mounted on said lug adapter for engaging said wheel face and rotating with said wheel;
    a wheel contact member engagement structure mounted on said lug adapter for applying a frictional force to said wheel contact member resisting rotational movement of said wheel contact member and said wheel when said wheel contact member engages said wheel; and
    a manually operable control structure in operative association with said wheel contact member engagement structure to selectively vary the magnitude of the frictional force applied to said wheel contact member by said wheel contact member engagement structure, said manually operable control structure including a hand knob assembly manually movable relative to said lug adapter and relative to said wheel contact member to selectively either increase or decrease the magnitude of frictional force applied to said wheel contact member by said wheel contact member engagement structure, said hand knob assembly including a rotatable hand knob threadedly engaged with said lug adapter and rotatable relative to said lug adapter about an axis of rotation concentric with the longitudinal axis of said lug adapter and wherein said apparatus includes a dial housing connected to said lug adapter and fixed against rotation relative to said lug adapter, and rotation of said rotatable hand knob in a predetermined direction being operable to move said dial housing along said lug adapter in the direction of said wheel contact member, said dial housing and said wheel contact member defining an interior space therebetween.

2. The apparatus according to claim 1 wherein said wheel contact member has a disc configuration having a central opening receiving said lug adapter and allowing rotation thereof about said lug adapter, said lug adapter threadedly attached to the distal end of said axle.

3. The apparatus according to claim 2 wherein said lug adapter includes a wrench engagement area to facilitate attachment of said lug adapter to said axle or detachment of said lug adapter from said axle.

4. The apparatus according to claim 2 wherein said lug adapter includes an internal lug adapter thread engageable with an outer thread on the distal end of said axle and an external lug adapter thread.

5. The apparatus according to claim 1 wherein said hand knob assembly additionally includes an indexing mechanism for indicating to a user the magnitude of frictional force applied to said wheel contact member by said wheel member engagement structure caused by movement of said hand knob relative to said dial housing.

6. The apparatus according to claim 5 wherein said indexing mechanism includes balls and also includes ball detents formed by said dial housing for receiving said balls.

7. The apparatus according to claim 6 wherein said balls are spring biased ball bearings.

8. The apparatus according to claim 1 wherein said manually operable control structure additionally comprises a compressible cushion formed of resilient material located in the interior space between said dial housing and said wheel contact member about said lug adapter, said cushion located in a counterbore formed by said wheel contact member and expanding outwardly within said counterbore responsive to compression thereof due to movement of said dial housing toward said wheel contact member, the outward expansion of said cushion forming a tighter engagement with said wheel contact member, and the cushion spins about the lug adapter with the wheel contact member.

9. The apparatus according to claim 8 wherein said manually operable control structure additionally comprises a cushion engagement washer disposed about said lug adapter and slidably and rotatably mounted on said lug adapter, said cushion engagement washer engaging a side of said cushion and causing outward expansion of said cushion during compression of said cushion, said cushion engagement washer spinning with said cushion and with said wheel contact member when said cushion is compressed.

10. The apparatus according to claim 9 wherein said cushion engagement washer has an outer diameter smaller than the outer diameter of said cushion.

11. The apparatus according to claim 9 including a slip washer disposed on said lug adapter between said cushion engagement washer and a third washer on said lug adapter, said slip washer slipping and spinning between said cushion engagement washer and said third washer when no force is being applied thereto by said hand knob assembly.

12. The apparatus according to claim 11 wherein said slip washer is operable to gradually become binded to both said cushion engagement washer and to said third washer during tightening by said hand knob assembly due to compression of said cushion.

13. The apparatus according to claim 12 wherein said wheel contact member is out of engagement with said wheel when no force is being applied by said slip washer by said hand knob assembly and moved into engagement with said wheel during tightening by said hand knob assembly.

14. The apparatus according to claim 12 including a compression limiting structure to for limiting compression of said cushion.

15. The apparatus according to claim 1 wherein said wheel contact member has a disc configuration and a wheel engaging surface having grooves.

\* \* \* \* \*